United States Patent [19]

Newton

[11] Patent Number: 4,493,407

[45] Date of Patent: Jan. 15, 1985

[54] ARMATURE ASSEMBLY FOR AN ELECTROMAGNETIC CLUTCH

[75] Inventor: Paul P. Newton, Beloit, Wis.

[73] Assignee: Warner Electric Brake & Clutch Company, South Beloit, Ill.

[21] Appl. No.: 330,651

[22] Filed: Dec. 14, 1981

[51] Int. Cl.³ .................. F16D 3/12; F16D 3/76; F16D 27/10
[52] U.S. Cl. .................. 192/84 C; 192/106.1; 464/75
[58] Field of Search .............. 192/84 C, 106.1; 464/75; 403/372, 226

[56] References Cited

U.S. PATENT DOCUMENTS

| 288,134 | 11/1883 | Stone | 464/75 X |
|---|---|---|---|
| 1,674,225 | 6/1928 | Reed | 192/106.1 |
| 1,674,226 | 6/1928 | Reed | 192/106.1 |
| 1,719,623 | 7/1929 | Reed | 192/106.1 |
| 1,719,624 | 7/1929 | Reed | 192/106.1 |
| 1,761,526 | 6/1930 | Geyer | 464/75 X |
| 1,803,937 | 5/1931 | Jansson | 192/106.1 |
| 1,825,981 | 10/1931 | Reed | 192/106.1 |
| 2,725,692 | 12/1955 | Andreae | 403/372 X |
| 2,996,900 | 8/1961 | Fermier | 64/14 |
| 3,396,556 | 8/1968 | Giegerich | 64/14 |
| 3,752,279 | 8/1923 | Briar | 192/84 C |
| 4,160,498 | 7/1979 | Newton et al. | 192/84 C |
| 4,187,939 | 2/1980 | Silvestrini et al. | 192/84 C |
| 4,197,759 | 4/1980 | Krebs et al. | 403/372 X |

OTHER PUBLICATIONS

Brochure of Ogura Clutch Co., Ltd. entitled "Clutches for Mobile Air Conditioning".

*Primary Examiner*—Rodney H. Bonck
*Attorney, Agent, or Firm*—Leydig, Voit, Osann, Mayer & Holt, Ltd.

[57] ABSTRACT

An armature of an electromagnetic clutch is connected by a mounting plate to a toothed driven hub of the clutch through the intermediary of an annular elastomeric spider. When the parts are assembled, the spider is precompressed around its entire periphery and all parts of the spider remain in compression when torque is transmitted through the spider.

1 Claim, 6 Drawing Figures

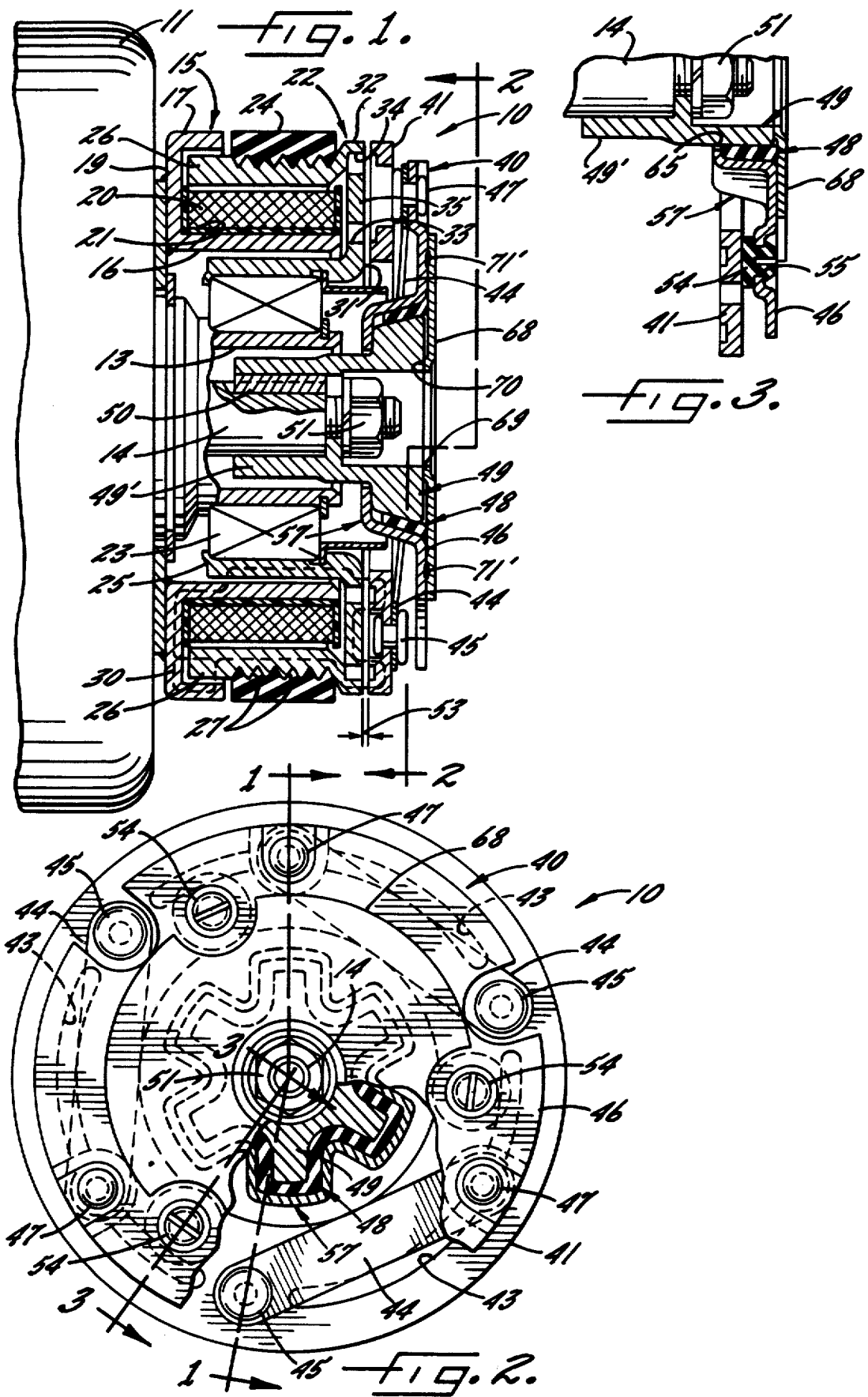

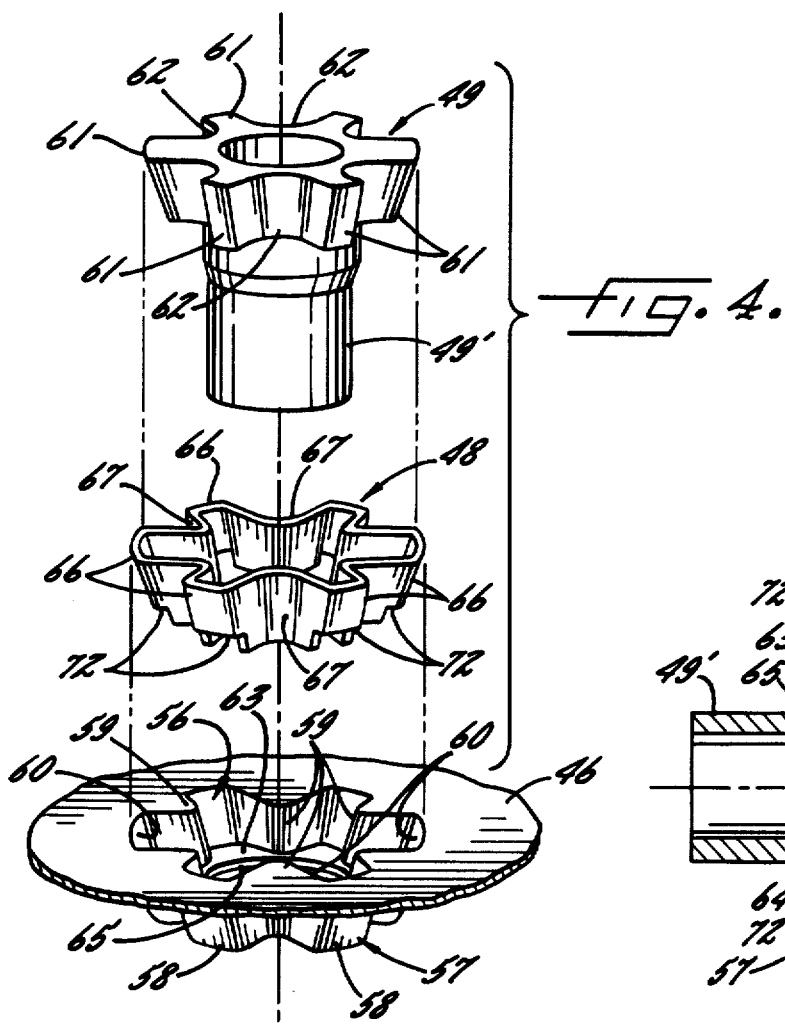
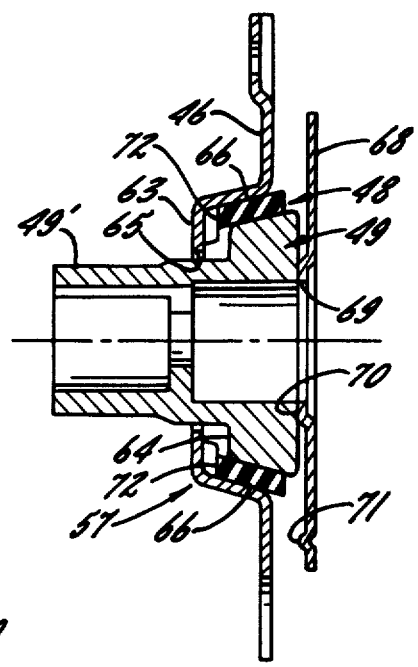
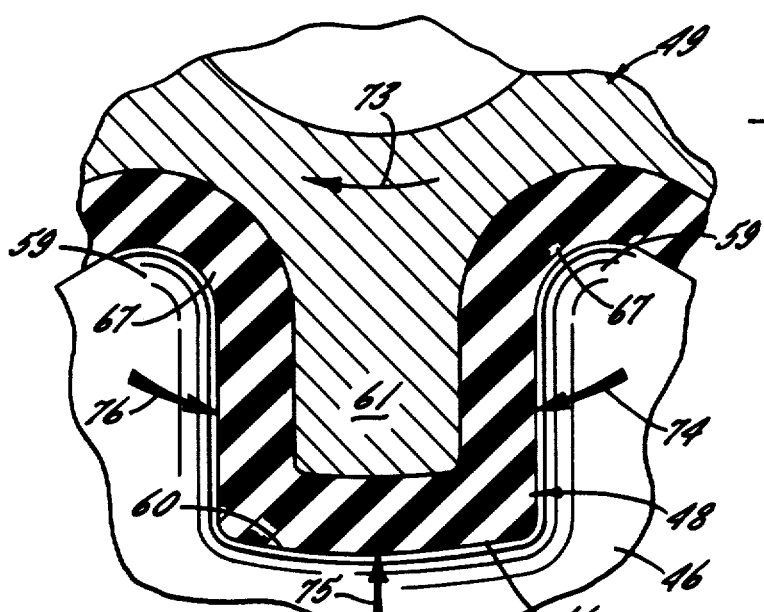

ARMATURE ASSEMBLY FOR AN ELECTROMAGNETIC CLUTCH

BACKGROUND OF THE INVENTION

This invention relates to an armature assembly for an electromagnetic coupling such as an electromagnetic clutch. In such a clutch, an armature is connected to a driven hub by a mounting plate and is adapted to be coupled to a driving rotor when an electromagnet is excited to engage the clutch. When the clutch is engaged, the rotor acts through the armature and the mounting plate to rotate the driven hub.

In order to dampen torsional shock and vibration, the armature mounting plate is connected to the driven hub by an elastomeric annulus or spider disposed between the plate and the hub. An electromagnetic clutch with an elastomeric spider is disclosed in Silvestrini et al U.S. Pat. No. 4,187,939.

Difficulty has been encountered with prior electromagnetic clutches having elastomeric spiders in that portions of the spider are subjected to tension and shear forces which may cause the spider to fail.

SUMMARY OF THE INVENTION

The general object of the invention is to provide a new and improved armature assembly in which all parts of the annular elastomeric spider are maintained in compression even when torque is applied to the spider when the clutch is engaged.

A more detailed object is to achieve the foregoing by constructing the mounting plate, the hub and the spider in a novel manner so that, as these parts are assembled, the spider is compressed and thereby remains in compression when torque is applied.

The invention also resides in the details of construction of the mounting plate, the hub and the spider.

BRIEF DESCRIPTION OF THE DRAWINGS

FIG. 1 is sectional view of a typical electromagnetic coupling equipped with a new and improved armature assembly incorporating the unique features of the present invention, the view being taken substantially along the line 1—1 in FIG. 2.

FIG. 2 is a cross-sectional view taken along the line 2—2 in FIG. 1.

FIG. 3 is a fragmentary sectional view taken along the line 3—3 in FIG. 2.

FIG. 4 is an exploded perspective view of the hub, the annular spider and the mounting plate.

FIG. 5 is a fragmentary view generally similar to FIG. 1 but showing the parts in their positions as they are assembled.

FIG. 6 is an enlarged fragmentary sectional view similar to portions of FIG. 2 and illustrating the compressive stresses imposed upon the spider.

DETAILED DESCRIPTION OF THE PREFERRED EMBODIMENT

For purposes of illustration, the present invention is shown in connection with an electromagnetic coupling 10 which herein is in the form of an electromagnetic clutch. The clutch 10 is shown as being used in conjunction with an automobile air conditioning compressor 11 having a tubular nose 13 for mounting the clutch and having a drive shaft 14 which extends through the nose.

The clutch 10 includes an electromagnet which is formed in part by an annular magnet core 15 of substantially J-shaped radial cross-section and having an inner pole ring 16 and an outer pole ring 17. Formed integrally with and extending radially between the rear ends of the two pole rings is a bridge 19 which is rigidly secured to the end of the compressor 11. A multiple turn winding 20 is secured within a U-shaped channel 21 which, in turn, is fastened to the outer side of the inner pole ring 16. Reference may be made to Newton et al U.S. Pat. No. 4,160,498 for a more detailed disclosure of the magnet core 15.

An annular rotor 22 is rotatably journaled on the nose 13 of the compressor 11 by a bearing 23 and is adapted to be driven from the engine of the vehicle by an endless belt 24. The rotor is substantially U-shaped in radial cross-section and includes inner and outer concentric annular pole pieces 25 and 26 made of magnetic material, the inner pole piece being secured to the outer race of the bearing. Several axially spaced grooves 27 extend circumferentially around the outer side of the outer pole piece 26 and interfit with complemental ribs on the inner side of the drive belt. Accordingly, the outer pole piece defines a pulley for the belt.

The inner pole piece 25 of the rotor 22 is spaced inwardly from the inner pole ring 16 of the magnet core 15 while the outer pole piece 26 of the rotor is located between and is spaced from the winding 20 and the outer pole ring 17 of the core. When the winding 20 is excited by a voltage source, magnetic flux is produced and threads through the core and the rotor and across the various gaps between the pole rings and the pole pieces. The nature of the controlled flux transfer between the core and the rotor is explained in more detail in the aforementioned Newton et al patent.

Pole faces 31 and 32 are defined by the forward ends of the rings 25 and 26, respectively. The pole faces are magnetically isolated from one another by radially spaced sets 33 and 34 of angularly spaced arcuate slots but are physically connected by an intervening ring 35 located between the two sets of slots.

Located in opposing relation to the pole faces 31 and 32 is an armature assembly 40. Herein, the armature assembly includes an armature 41 in the form of a circular disc made of magnetic material and having a series of angularly spaced and arcuate slots 43 (FIG. 2) located between its inner and outer sides. Three leaf springs 44 are spaced angularly around and extend generally chordwise of the armature. One end of each spring is connected to the armature by a rivet 45 while the other end of each spring is connected to an annular metallic mounting plate 46 by a rivet 47. The mounting plate is located forwardly of the armature and an elastomeric annulus or spider 48, which preferably is made of rubber, couples the mounting plate to rotate in unison with a hub 49. The hub is integral with a hollow shaft or sleeve 49' keyed to the compressor shaft 14 at 50 and is clamped in an axially fixed position on the shaft by a nut 51 which is threaded onto the shaft 14.

The springs 44 coupled the armature 41 for rotation in unison with the mounting plate 46, the spider 48 and the hub 49 and urge the armature away from the pole faces 31 and 32 of the magnet rotor 22. When the winding 20 is not excited, a narrow axial air gap 53 (FIG. 1) exists between the armature and the pole faces. Upon excitation of the winding, the flux threading along a path 30 cuts across the gap 53 to draw the armature 41 into frictional engagement with the pole faces 31 and 32 and thereby couple the armature and the rotor for rotation in unison. The shaft 14 thus is rotated by way of the leaf springs 44, the mounting plate 46, the elastomeric spider 48 and the hub 49. A plurality of rubber bumpers 54 (FIGS. 2 and 3) are mounted in holes 55 angularly spaced around the mounting plate 46 to prevent the latter from engaging the armature 41.

The purpose of the elastomeric spider is to absorb torsional shock when the armature 41 initially engages the pole faces 31 and 32 and to dampen torsional vibration during rotation of the shaft 14. The spider is disposed in a hole 56 in the mounting plate 46 between the latter and the hub 49 on the end of the shaft 49'. Herein, the mounting plate is a sheet metal stamping with a central cup portion 57 which projects rearwardly and forms the hole 56. As shown in FIG. 4, the side wall 58 of the cup is formed with a plurality of inwardly projecting teeth 59 angularly spaced around the side wall with intervening valleys 60. The hub 49 is formed with radially outwardly projecting teeth 61 and intervening valleys 62, there being the same number of teeth 61 and valleys 62 on the hub as there are teeth 59 and valleys 60 on the cup side wall. As shown in FIG. 1, the elastomeric member 48 is disposed between the toothed portion of the cup 57 and the toothed portion of the hub 49.

In some instances where the compressor 11 malfunctions, the shaft 14 locks against rotation. Under such circumstances, the armature 41 slips relative to the rotor 22 and this generates heat which may melt the elastomeric spider or member 48. To prevent the mounting plate 46 and the armature from flying off the hub 49 in such a case, the cup 57 is formed with an end wall 63 which projects behind an annular shoulder 64 on the hub 49, the shaft 49' projecting through an opening 65 in the end wall. Thus, should the elastomeric member melt, engagement of the end wall and the shoulder hold the mounting plate and the armature on the assembly.

In accordance with the present invention, the mounting plate 46, the hub 49 and the elastomeric member 48, which preferably is made of rubber, are constructed and arranged in a novel manner so that all portions of the member 48 are in compression when the clutch 10 is engaged and the drive is through the member. As a result, the possibilities of the member failing are substantially reduced because an elastomer such as rubber is comparatively strong in compression and relatively weak when subjected to shear or torsion stresses. The foregoing is achieved by sizing the member 48 so that, in its natural condition, its cross section is larger than the space in the hole 56 between the mounting plate and the hub. Thus, when the parts are assembled, the member 48 is preloaded or precompressed and at least a portion of this compression is maintained completely around the member during driving conditions.

As shown in FIG. 4, the elastomeric member 48 is a rubber annulus with alternating teeth 66 and valleys 67 which interfit respectively with the valleys 60 and the teeth 59 on side wall 58 of the cup 57 and conversely with the teeth 61 and the valleys 62 on the hub 49. In a typical application, the cross section of the rubber annulus is on the order of between 0.060 and 0.080 of an inch larger than the space which normally would be left between the side wall and the hub. As a result, when the annulus is inserted in the cup and the hub is loosely placed inside the annulus, the hub is spaced from the end wall 63 of the cup 57 as illustrated in FIG. 5. Thereafter in assembling the parts, a flat retainer plate 68 with a central opening 69 and an inwardly projecting annular boss 70 is placed against the hub with the boss bearing on the hub and the retainer plate is forced toward the mounting plate until the shoulder 64 on the hub engages the end wall 63 of the cup 57 thereby subjecting the rubber annulus to a compression force around the entire periphery of the annulus. In this condition of the parts, nibs 71 on the retainer plate engage the mounting plate and these nibs are welded to the mounting plate as indicated at 71' in FIG. 1 to hold the parts in the assembled position. If desired, the inner ends of the teeth 67 on the rubber annulus may be notched as indicated at 72 to prevent rubber from being forced in between the cup end wall 63 and the hub 49 as the latter is pressed into the cup.

In order to insure full and uniform compression of the rubber annulus 48, at least one set of coacting teeth and valleys on the hub 49 and the cup side wall 58 are flared outwardly in the forward direction, that is, the direction outwardly of the armature 41. Herein, the teeth 61 on the hub and the valleys 60 on the side wall are flared while the teeth 59 on the side wall and the valleys 62 on the hub extend generally longitudinally of the shaft 49'. The teeth 67 and the valleys 68 on the rubber annulus are basically complemental to the teeth and valleys on the hub and on the side wall of the cup 57.

With the clutch 10 deenergized and the armature 41 not rotating, the rubber of the annulus 48 is in a state of residual compressive stress at all points around its periphery. When torque is applied to the mounting plate 46 as, for example, in the direction of the arrow 73 in FIG. 6, the compressive stress on the rubber at 74 increases while the compressive stress at 75 remains essentially unchanged. At 76 on the leading edge of a tooth 67, the compressive stress is reduced somewhat but the reduction is not sufficient to change the stress from one of compression to one of tension. Thus, even under torque, all parts of the annulus are in compression. It also should be observed that the arrangement of the present invention permits the use of rubbers of different durometer values for the annulus and this permits the amount of the damping effect of the annulus to be varied to best suit each particular application.

I claim:

1. An armature assembly for an electromagnetic coupling, said assembly comprising a forwardly disposed mounting plate and a rearwardly disposed armature, means connecting said armature and said plate for rotation in unison while permitting said armature to move toward and away from said plate, a hole extending axially through said plate, the periphery of said hole being defined by a first set of circumferentially spaced teeth and by a first set of circumferentially spaced valleys which alternate with the teeth, a shaft having a hub formed on one end portion thereof, said hub having a second set of circumferentially spaced teeth and having a second set of circumferentially spaced valleys which alternate with the second teeth, said hub being telescoped into said hole with the teeth of each set being disposed within and spaced from the valleys of the other set, at least the teeth of one set and the valleys of the other set being flared outwardly in the forward direction, an annulus of elastomeric material disposed within said hole between said hub and the periphery of the hole and having alternating teeth and valleys interfitting with the teeth and valleys on the hub and in said hole, the cross section of said annulus being sized so that the annulus is pre-compressed between the hub and the hole at all points around the periphery of the annulus by forcing the hub inwardly, and means forcing and holding said hub inwardly to pre-compress said annulus and hold the entire annulus in a state of residual compressive stress when torque is applied and transmitted through the annulus between the mounting plate and the armature.

* * * * *